Dec. 24, 1963 R. L. PARRIS 3,115,616
MECHANICAL VIBRATION PICK-UP FOR USE IN HIGH NOISE FIELDS
Filed March 31, 1958
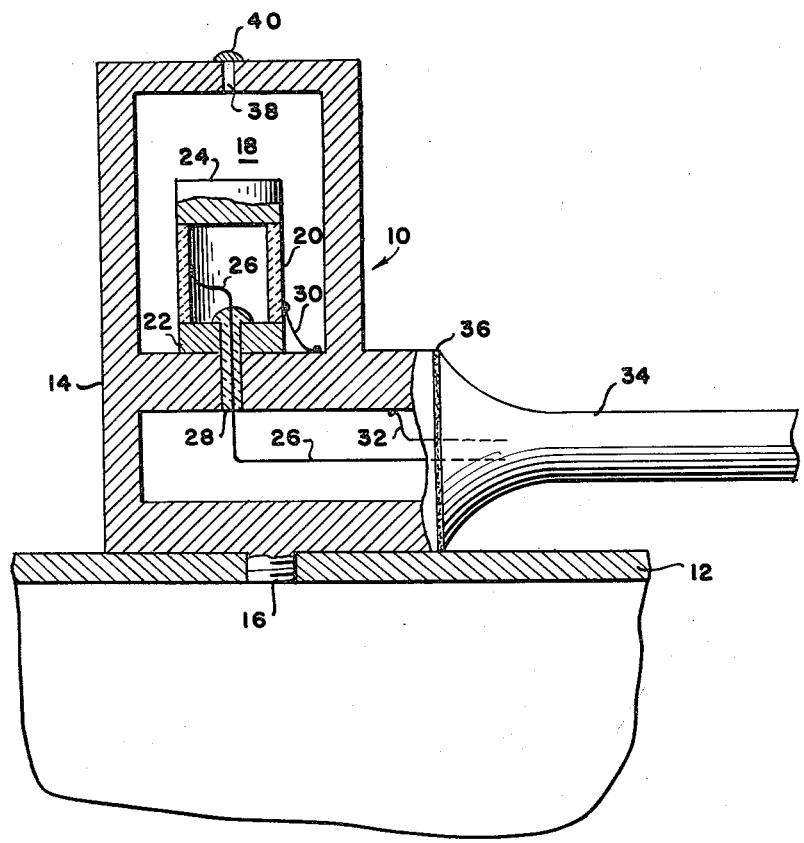
INVENTOR
Robert L. Parris,
BY
B. L. Zangwill
ATTORNEYS United States Patent Office 3,115,616
Patented Dec. 24, 1963

1

3,115,616
MECHANICAL VIBRATION PICK-UP FOR USE IN HIGH NOISE FIELDS
Robert L. Parris, Falls Church, Va., assignor to the United States of America as represented by the Secretary of the Navy
Filed Mar. 31, 1958, Ser. No. 725,456
1 Claim. (Cl. 340—17)
(Granted under Title 35, U.S. Code (1952), sec. 266)

The invention described herein may be manufactured and used by or for the Government of the United States of America for governmental purposes without the payment of any royalties thereon or therefor.

This invention relates to a mechanical vibration pick-up for use in high noise fields.

In measuring the vibration of an object, the usual procedure is to fasten a transducer or pick-up which is sensitive to acceleration or velocity to the surface of a vibrating member. In actual operation, however, when the output of the transducer is recorded, a number of extraneous noise signals appear on the output of the transducer. These noise signals, upon investigation, prove to be caused by a number of factors. Nearby motors or noise generating devices will cause sound waves to be transmitted to the transducer which will then appear at the output of the transducer. In addition the vibrating surface may generate other sound waves which will be transmitted to the transducer thereby causing extraneous noises of varying amplitude and frequency. These noises are not constant but will vary with the speed of operation of the interfering machine and will also vary as the vibrating surface may change in position. This will happen when the vibrating surface, such as a ship, flows through water of varying density or comes close to reflecting surfaces in the water.

In the past these noises have been eliminated by physically removing the transducer from the vibrating surface, suspending the transducer in the proximity thereof, and measuring the output voltage. The measurement of the transducer pick-up when attached to the vibrating surface was corrected by the measurement of the transducer when removed from the surface. This method required the removal of the transducer for each measurement and therefore a continuous recording of the vibrating characteristics was practically impossible to obtain. In addition suitable correction circuits and filters were required which appreciably increase the cost and complexity of the vibration measuring equipment.

If the transducer were used on a ship or a submarine, a large waterproof container surrounding the pick-up was required to allow submergence of this unit to various test depths required for operation. Large containers were necessary to allow sufficient distance between the container wall and the transducer to sufficiently attenuate the water borne noise. As a result of making this case large, it was found that the structural resonances of the case would seriously limit the effective frequency range of measurement. The case had natural vibration frequencies of low order so that the utility of the pick-up device was limited to ranges below or above the frequencies of the case. In addition it is difficult mechanically to attach these large cases to small structures or to measure the vibration characteristics of a small unit of area on a large vibrating surface.

The applicant has found that the extraneous noise can be eliminated for all practical purposes by mounting the transducer in a casing and evacuating the space between the transducer and the casing. This evacuated space or vacuum will not transmit sound waves and therefore the output of the transducer is responsive solely to the movement of the transducer and casing. Moreover, through the use of a vacuum envelope the entire device can be made far smaller than any previous device of the same kind. The outer casing, because of its smaller size, has a much higher natural resonant frequency than the outer casings of prior devices; consequently, the new device has an extended utility in that it is capable of detecting higher mechanical vibration frequencies without interference by its own inherent frequencies generated primarily by the case structure. In addition the device is simpler to make and may be made at a considerably decreased cost.

A primary object of this invention is therefore to provide a transducer for measuring vibration where the effects of extraneous noise, no matter how they are generated, may be eliminated.

Another object of this invention is to provide a transducer capable of operating in water or air which may be made smaller and thereby may measure a smaller area of vibration.

Other objects and advantages of the invention will hereinafter become more fully apparent from the following description of the annexed drawing, which illustrates a preferred embodiment, wherein the single drawing shows a view partly in cross-section of the invention.

Referring to the drawing a mechanical vibration pick-up is indicated generally at 10. It is adapted to be fastened to a vibrating surface 12 such as a ship hull by means of a stud 16.

The pick-up 10 consists of a casing 14 which has a chamber 18 which is adapted to mount a transducer unit 20. In some applications a particular frequency of vibration may be desired to be eliminated from the output of the transducer. In that case a quarter wave length isolator 22 is fastened to the casing 14. The quarter wave length isolator 22 will act as an open circuit or prevent the passage of the undesired frequency of vibration to the transducer 20. The transducer 20 is then fastened by any suitable means to the quarter wave length isolator 22. The transducer 20 is cylindrical in shape and consists of a ceramic which is pressure sensitive such as barium titanate. Attached to the top of the transducer 20 is a reference mass 24 which is made of brass and which will slightly deform the transducer 20 when it is accelerated in any direction.

A connecting lead 26 is connected to the inside of the transducer 20 and is led out through the quarter wave length insulator 22 and the casing 14 by means of a Stupakoff type glass seal 28. Another connecting lead 30 is attached to the outside of the transducer 20 and is connected to the casing 14 and therethrough to the other connecting lead 32. The two leads 26 and 32 are brought out through a pressure proof noise free cable 34. The cable 34 is attached to the casing 14 by means of a vulcanized seal 36.

At the top of the casing 14 is an opening 38 which has an evacuation seal 40 to render the casing 14 and particularly the chamber 18 airtight. In order to eliminate the extraneous noises which are transmitted through the water or air to the casing 14, through the chamber 18, and into the reference mass 24, the chamber 18 is evacuated to a low pressure vacuum by means of opening 38 and sealed by evacuation seal 40.

The degree of vacuum of chamber 18 will depend on the particular type of application, the relative noise level, and the degree of attenuation that is desired. In any particular case, however, the dimensions of the casing 14 need be only slightly larger than the dimensions of the transducer 20 or the transducer 20 and the reference mass 24. It can be seen that in this application the limiting size factor will therefore be dependent on the size of the transducer rather than on the size of the casing.

It should be understood of course that the foregoing disclosure relates to only a preferred embodiment of the invention and that it is intended to cover all changes and modifications of the example of the invention herein

What is claimed is:

A mechanical vibration pick-up for use in high noise fields comprising a casing, means for transferring vibrations of a vibrating structure to said casing, a transducer within said casing, isolating means within said casing for preventing the transmission to said transducer of vibrations of a predetermined frequency but allowing transmission of vibrations at frequencies other than said predetermined frequency, said isolating means comprising a quarter wavelength isolating member mounted inside said casing and having said transducer mounted thereon; a reference mass mounted on said transducer inside said casing and isolated therefrom, means for transmitting the output of said transducer to an indicating device, and an acoustic insulating medium in said casing about said transducer, said insulating medium comprising a vacuum for reducing extraneous pressure and sound variations transmitted to said reference mass and transducer through media other than said isolating member.

References Cited in the file of this patent

UNITED STATES PATENTS

| | | |
|---|---|---|
| 2,496,293 | Kiernan | Feb. 7, 1950 |
| 2,498,737 | Holden | Feb. 28, 1950 |
| 2,520,938 | Klein | Sept. 5, 1950 |
| 2,708,485 | Vogel | May 17, 1955 |
| 2,714,672 | Wright | Aug. 2, 1955 |
| 2,753,173 | Barnaby | July 3, 1956 |
| 2,783,449 | Loofbourrow | Feb. 26, 1957 |
| 2,808,522 | Dranetz | Oct. 1, 1957 |
| 2,824,243 | Sargeant | Feb. 18, 1958 |
| 2,873,604 | Samsel | Feb. 17, 1959 |
| 2,947,887 | Gulton | Aug. 2, 1960 |
| 2,947,889 | Rich | Aug. 2, 1960 |
| 2,961,637 | Camp | Nov. 22, 1960 |